United States Patent [19]

Klaassens et al.

[11] Patent Number: 5,010,471
[45] Date of Patent: Apr. 23, 1991

[54] THREE-PHASE AC-TO-AC SERIES RESONANT POWER CONVERTER WITH RESTUSED NUMBER OF SWITCHES

[75] Inventors: J. Ben Klaassens, Delft, Netherlands; Hian K. Lauw, Corvallis, Oreg.; Freddy de Beer, Delft, Netherlands

[73] Assignee: Robert F. Frijouf, Tampa, Fla.

[21] Appl. No.: 371,712

[22] Filed: Jun. 26, 1989

[51] Int. Cl.$^5$ .............................................. H02M 5/27
[52] U.S. Cl. ...................................... 363/160; 363/8
[58] Field of Search .................... 363/9, 10, 28, 157, 363/159–162, 164, 165

[56] References Cited

U.S. PATENT DOCUMENTS

| | | | |
|---|---|---|---|
| 3,678,367 | 7/1972 | McMurray | 363/9 |
| 3,742,336 | 6/1973 | Bedford | 363/9 |
| 3,882,370 | 5/1975 | McMurray | 363/135 |
| 3,953,779 | 4/1976 | Schwarz | 363/28 |
| 4,096,557 | 6/1978 | Schwarz | 363/9 |
| 4,333,135 | 6/1982 | Schwarz | 363/28 |
| 4,355,351 | 10/1982 | Schwarz | 363/9 |
| 4,417,197 | 11/1983 | Schwarz | 323/272 |

OTHER PUBLICATIONS

Schwarz, F. C., A method of resonant current pulse modulation for power converters, IEEE Transactions on Industrial Electronics and Control Instrumentation, vol. 17, No. 3, May 1970, pp. 209-221.
Schwarz, F. C., An improved method of resonant current pulse modulation for power converters, IEEE Transactions on, Industrial Electronics and Control Instrumentation, IECI-23, No. 2, Jul. 14, 1975 pp. 133-141.
Schwarz, F. C., Klaasens, J. B., A controllable secondary multikilowatt dc current source with constant maximum power factor in its three phase supply line, IEEE Transactions on Industrial Electronics and Control Instrumention, vol. 23, No. 2, May 1976, pp. 142-150.
S. W. H. De Haan, A new integral pulse module for series-resonant converter, IEEE Transactions on Industrial Electronics, vol. IE-31, No. 3, Aug. 1984, pp. 255-262.
J. B. Klaassens, DC to AC series-resonant converter system with high internal frequency generating synthesized waveforms for multikilowatt power levels, IEEE Power Electronics Specialists Conference, Jun. 1984, Gaithersburg, Md., U.S.A., pp. 99-110.
Schwarz, F. C., Engineering information on an anlog signal to discrete time interval converter, NASA CR-134544, Sep. 1973.
Schwarz, F. C., Klaassens, J. B., A controllable 45-kw current source for dc machines, IEEE Transactions on Industry Applications, vol. IA-15, No. 4, Jul./Aug. 1979, pp. 437-444.
Schwarz, F. C., A doublesided cycle-converter, IEEE Power Electronics Specialists Converence, San Diego, Jun. 1979, pp. 437-447.

Primary Examiner—William H. Beha, Jr.
Attorney, Agent, or Firm—Frijouf, Rust & Pyle

[57] ABSTRACT

An apparatus and method is disclosed for an improved AC—AC series-resonant converters incorporating power pulse modulation with internal frequencies of tens of kHz is applied to a series-resonant converter system for generating synthesized multiphase bipolar waveforms with reversible power flow and low distortion. The high pulse frequency allows the application of the principle of modulation and demodulation for fast system response. Switches are required which have bidirectional current conduction and voltage blocking ability. The conventional series-resonant AC—AC converter applies a total of 24 anti-parallel thyristors. The circuit configuration of the present invention is a series-resonant AC—AC converter with only 12 thyristors. Use of the converter results in a higher efficiency and lower costs. The alternative power circuit has three neutrals, related to the polyphase source, the load and the converter, which may be interconnected and the high-frequency component of the source and load currents will flow through the connection between the neutrals.

7 Claims, 13 Drawing Sheets

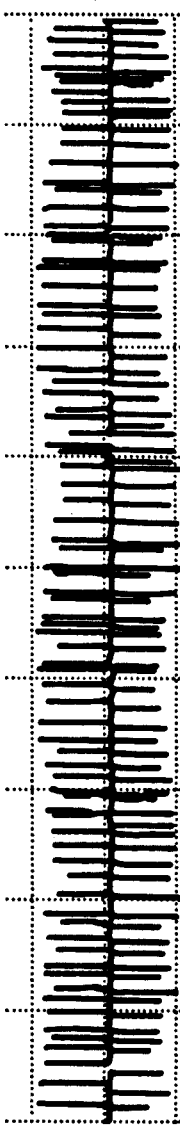
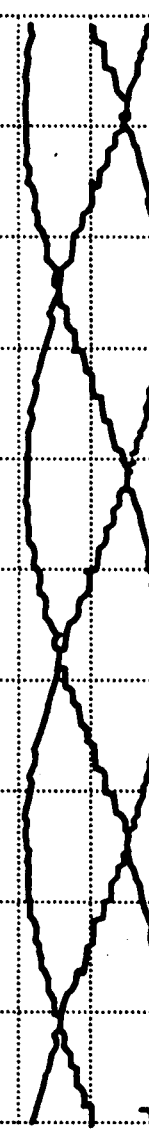
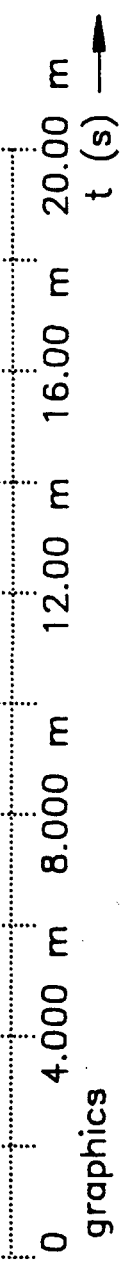
FIG. 9A
FIG. 9B
FIG. 9C
FIG. 9D

THREE-PHASE AC-TO-AC SERIES RESONANT POWER CONVERTER WITH RESTUSED NUMBER OF SWITCHES

BACKGROUND OF THE INVENTION

1. Field Of The Invention

This invention relates to power conversion and more particularly to an AC—AC series-resonant conversion system with only 12 thyristors.

2. Background Of The Invention

AC—AC series resonant conversion system have been developed because of the many potential applications, such as AC motor drives including the processes of the braking and reversing of the direction of rotation. Another possible application is the asynchronous coupling of two polyphase AC systems, such as interfacing a windmill generator and a power grid, in which a coupling element is required in the form of a power interface. The AC—AC series-resonant power converter shows good performance due to the intrinsic characteristics.

The series-resonant converter employs a modulated train of power pulses to generate a multiphase bipolar waveform. The high resolution obtained for the control and distribution of electric energy paves the way for this process of wave shaping. The fast response has its roots in the high internal frequency and the applied philosophy of control which avoids the interposition of low frequency filters in its signal processing system. A complex process of excitation of the double excited LC-circuit makes it possible to operate the power converter for both directions of the power flow. The natural limitation for the conversion ratio of the conventional series-resonant converter to be one, can be overcome. The developed converter system is studied with respect to the coupling of a three-phase AC voltage source and a three-phase AC load. But the electric energy can also be derived from a two terminal DC source of supply.

The use of a series-resonant circuit for power transfer and control, involves natural current commutation of the thyristors. Improved reliability results from the moderate stresses arising during the switching of semiconductor devices under zero current conditions in the resonant circuit.

The resonant circuit is considered to be a high-frequency alternating-current link between two sets of switching matrices at the input and output terminals of the AC—AC inverter. This high-frequency link allows the elimination of all low-frequency filters and transformers, which are a requirement by conventional AC—AC converters because of the interposition of a low-frequency direct-voltage or direct-current link between two sets of switching matrices. The generation of high-frequency components in the source and load currents can be reduced to relatively small quantities by the application of high-frequency filters of moderate size.

Direct operation by an AC-current link requires power switches to have bidirectional blocking and conducting capabilities. Bidirectional current capability is also mandatory for bipolar source and load currents. The more conventional series-resonant AC—AC converter applies, therefore, bipolar switches in arrangements of anti-parallel thyristors with a total of 24 individual thyristors.

Therefore, it is an object of the present invention to provide an improved series-resonant AC—AC converter with only 12 thyristor switches.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full under standing of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved three phase AC to AC series-resonant converters for transferring electrical power between input terminal means and output terminal means, comprising a resonant circuit including a capacitor and an inductor. A first and a second plurality of switch means interconnect the resonant circuit with the input terminal means and the output terminal means. A control means establishes the desired power transfer between the input terminal means and the output terminal means. The first and second plurality of switch means interconnecting the resonant circuit with the input terminal means and the output terminal means consist of only 12 switch means for transferring three phase power between the input terminal means and the output terminal means.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Figure 3:
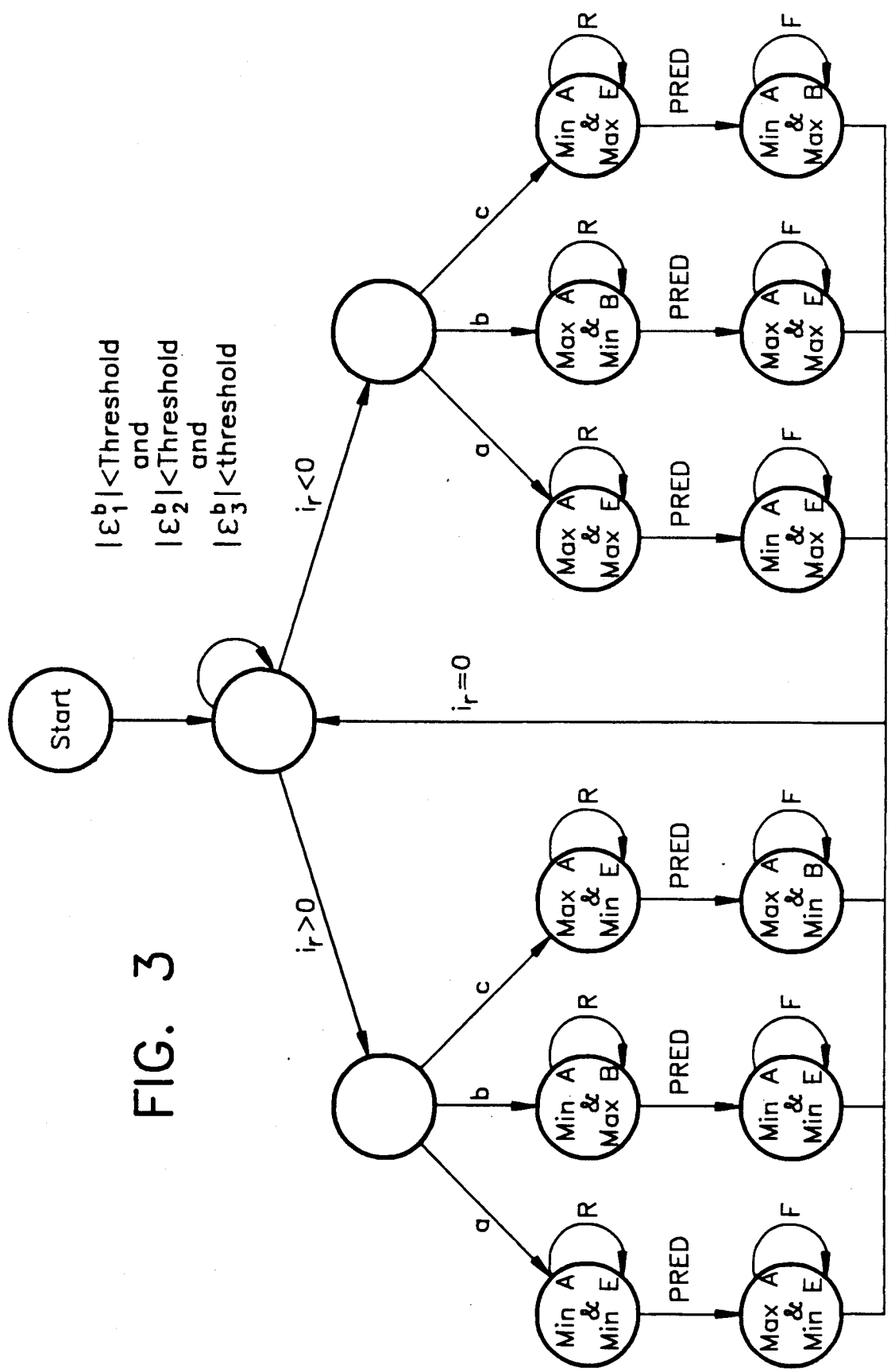
Figure 4A:
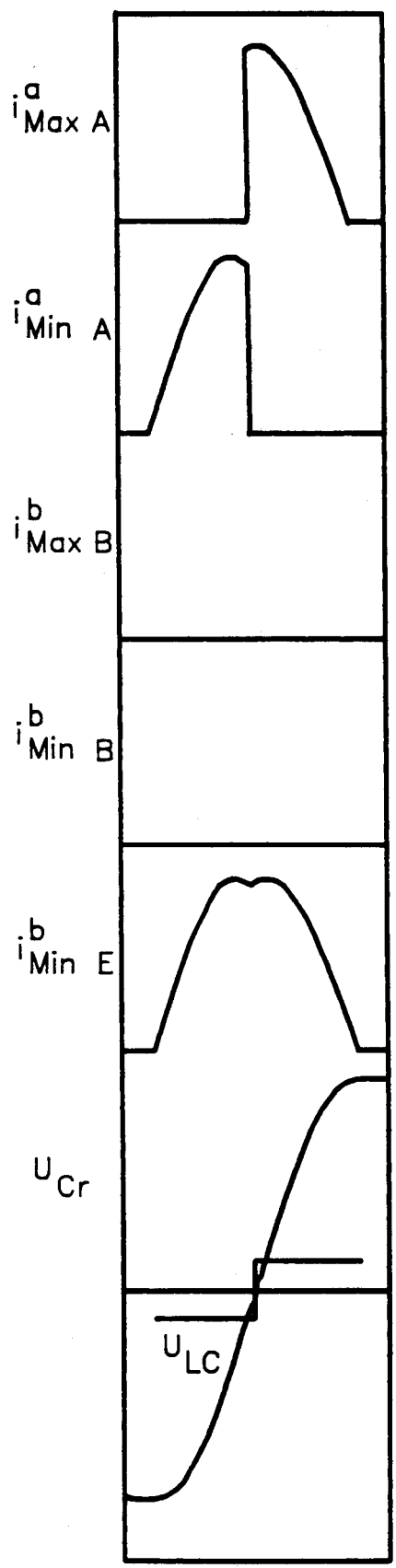
Figure 4B:
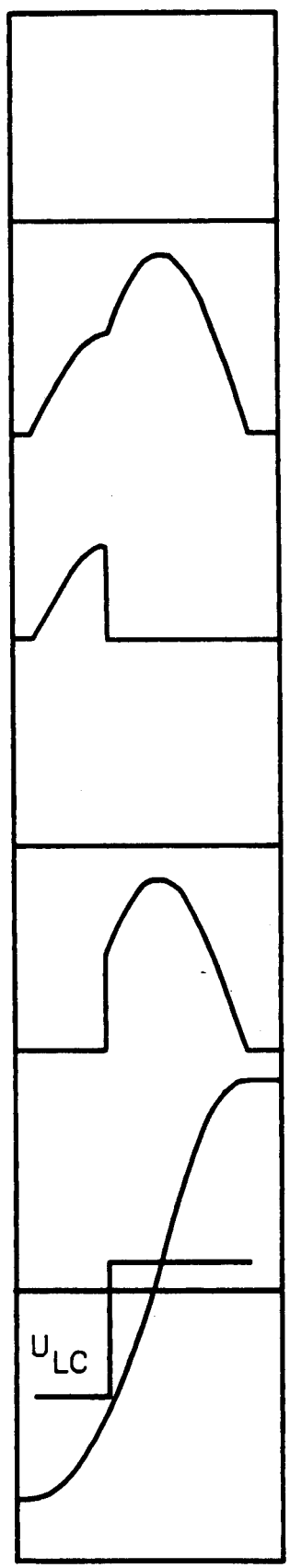
Figure 4C:
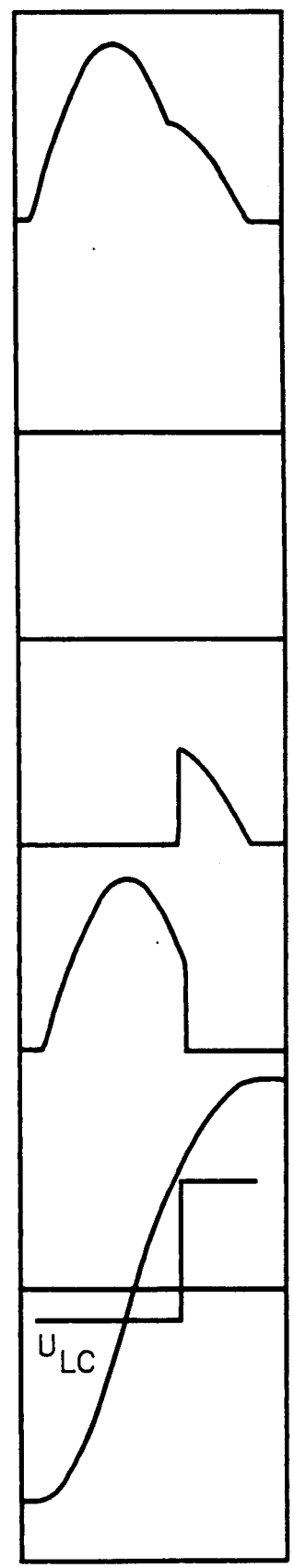
Figure 5:
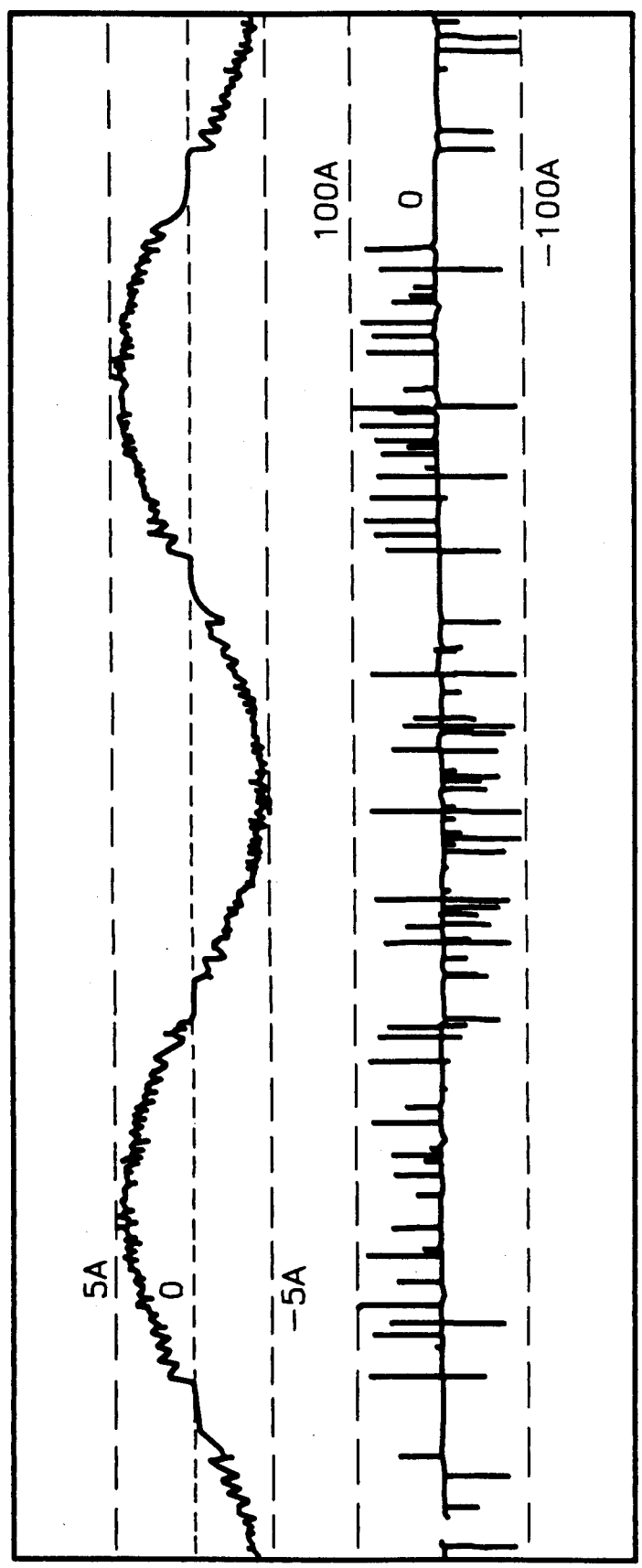
Figure 6:
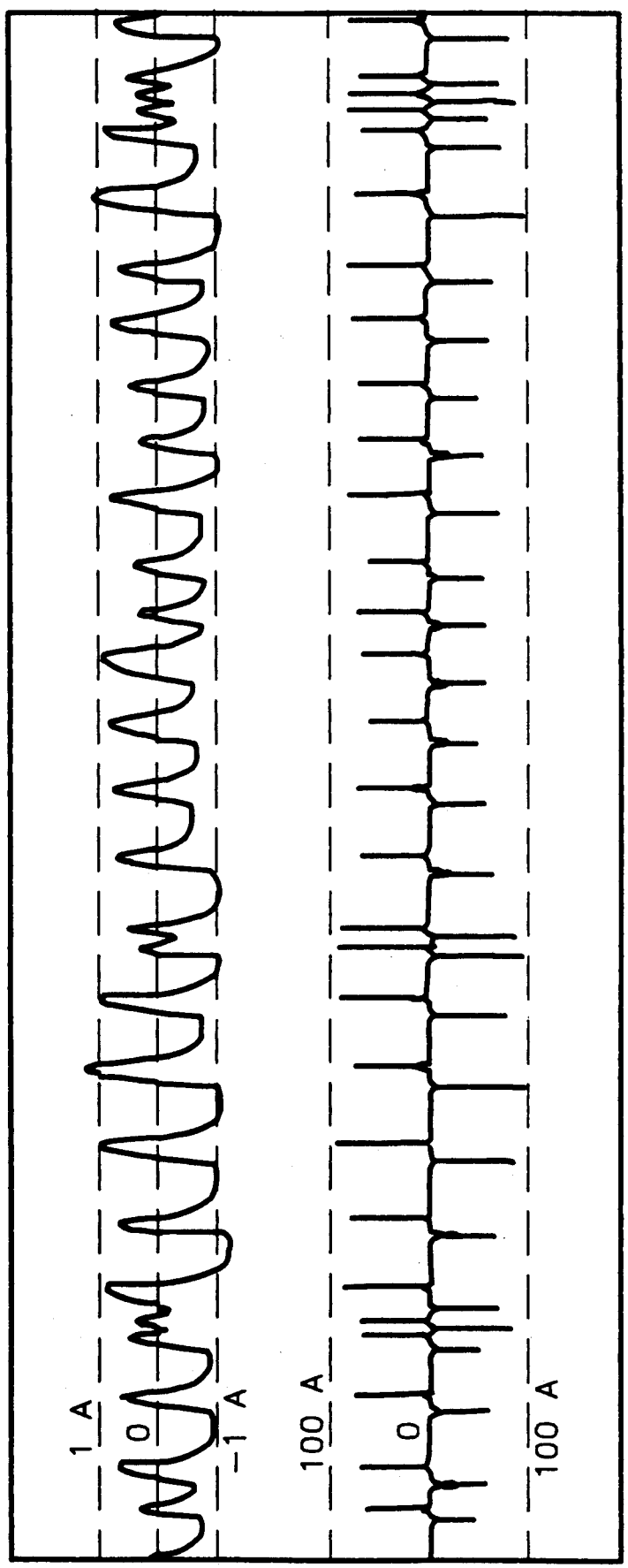
Figure 7:
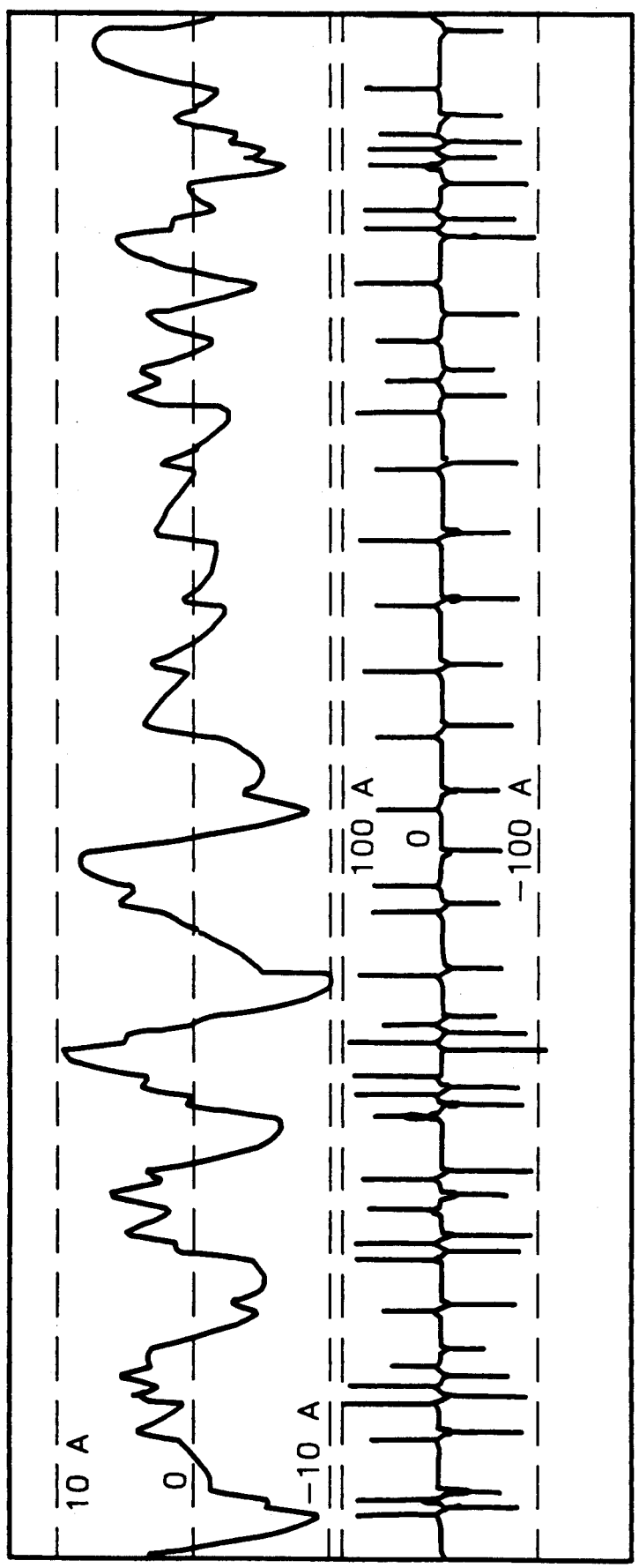
Figure 8:
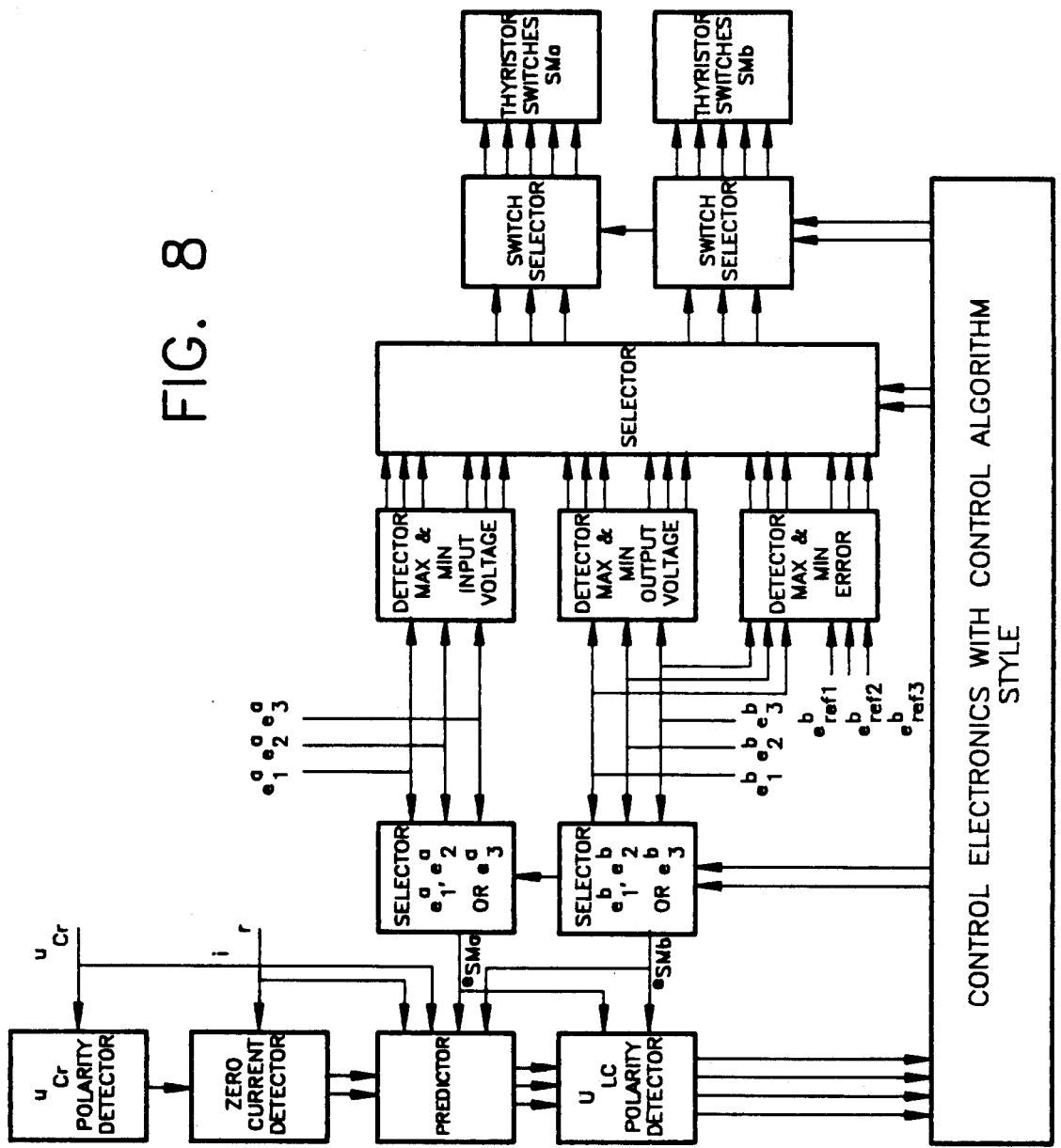

2A is a basic circuit configuration for an AC—AC series-resonant converter with 24 semiconductor switches; 2B is a basic circuit configuration for an AC—AC series-resonant converter of the present invention with 12 semiconductor switches;

FIG. 3 shows the flow diagram of the control algorithm of the series-resonant AC—AC converter;

FIGS. 4A–4C show typical waveforms of the resonant current, excitation voltage and the resonant capacitor voltage for various modes of operation of the converter;

FIG. 5 shows a measurement of the output current at 40 ms. with a resistive load with the upper trace illustrating load current and the lower trace illustrating resonant current;

FIG. 6 shows a measurement of the current through the link at 10 ms. with upper trace being the current through the link and the lower trace being the resonant current;

FIG. 7 is a measurement of the current through the link between at 10 ms with the upper trace being current through the link and the lower trace being resonant current;

FIG. 8 depicts a block diagram of the control electronics of the series-resonant power converter.

Figure 10:
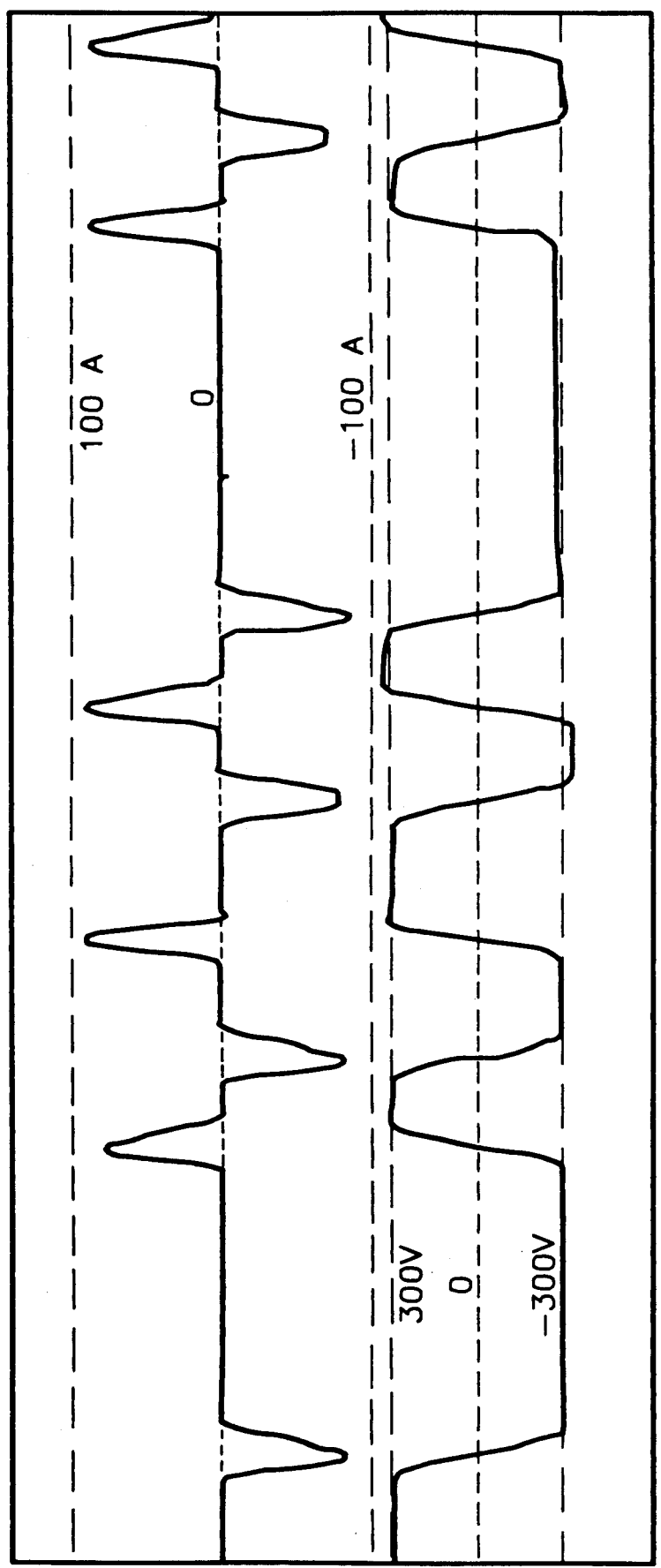
Figure 11:
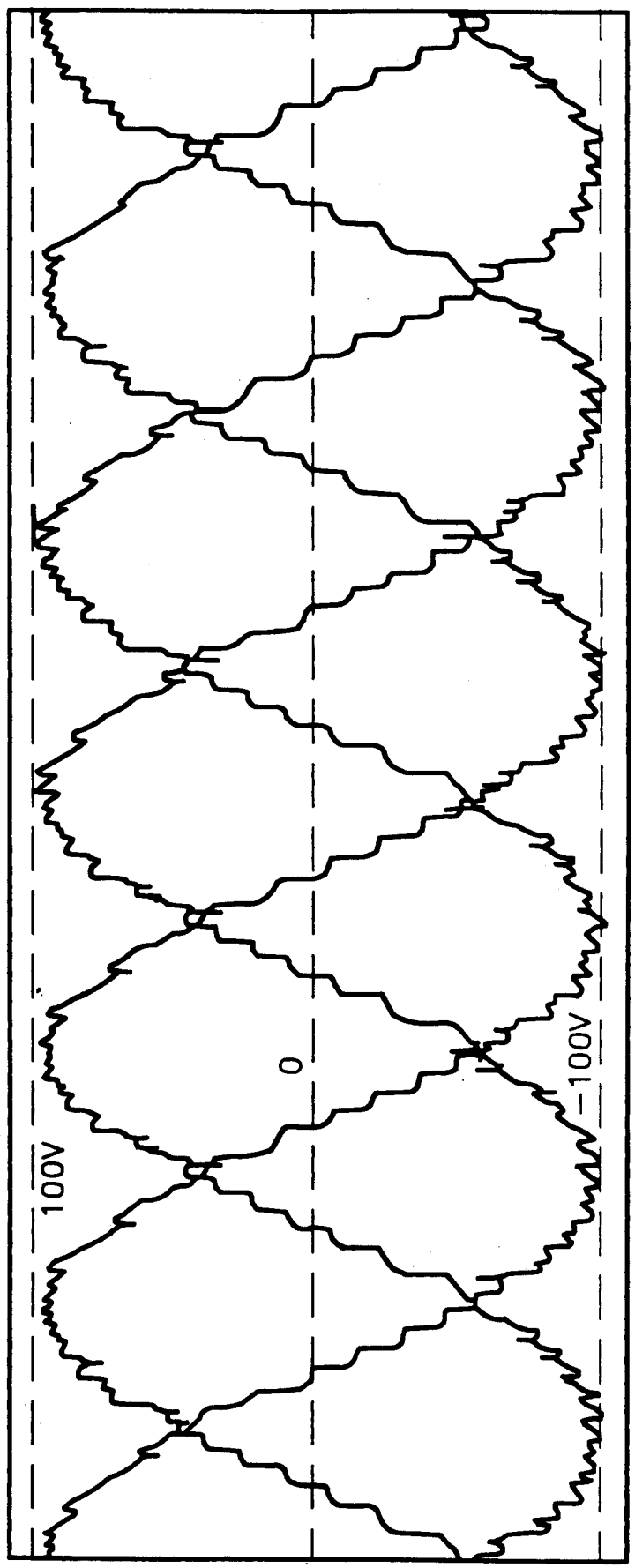
Figure 12:
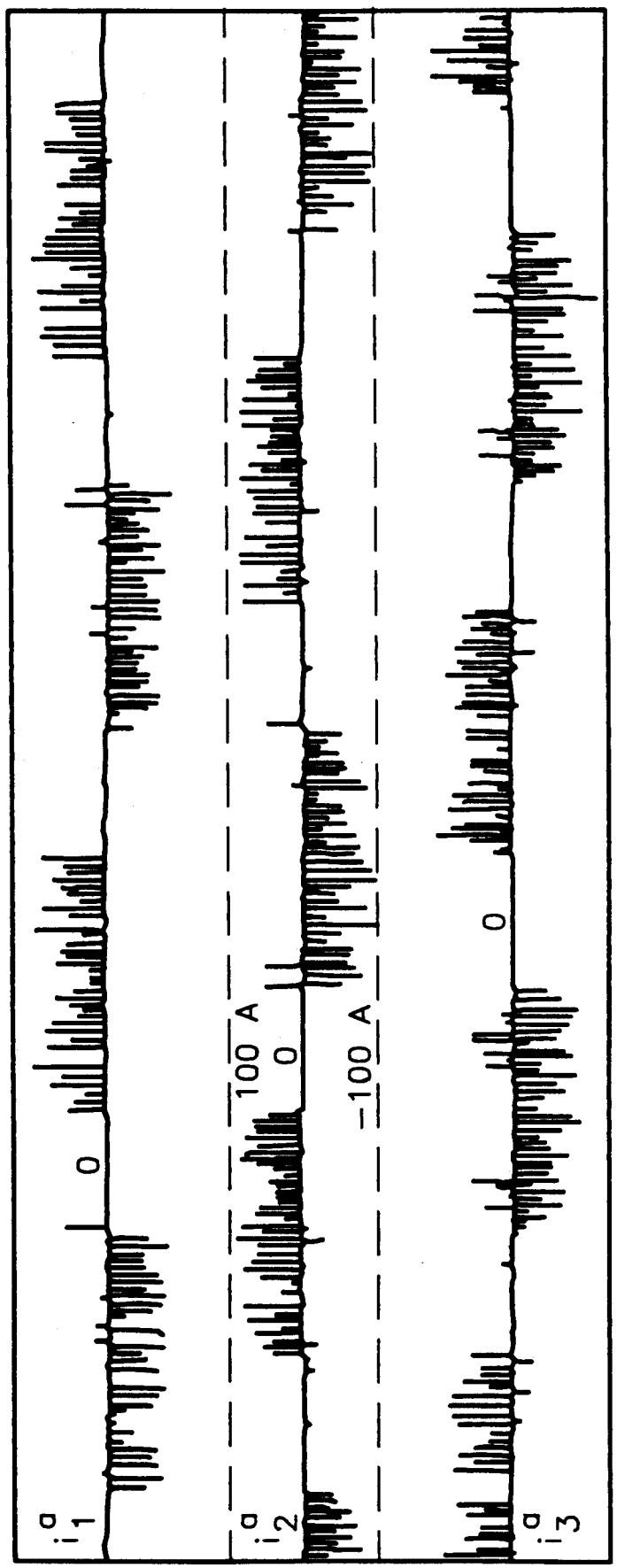

FIG. 9A illustrates the results of a computer simulation of the resonant current;

FIG. 9B illustrates the results of a computer simulation of the resonant capacitor voltage;

FIG. 9C illustrates the results of a computer simulation of the output voltage:

FIG. 9D illustrates the results of a computer simulation of the source voltage;

FIG. 10 shows the aperiodic waveforms of the resonant current and the resonant capacitor voltage; of FIG. 11 is a measurement of output voltages; and FIG. 12 shows a measurement of input currents.

Similar reference characters refer to similar parts throughout the several Figures of the drawings.

DETAILED DISCUSSION

Figure 1A:
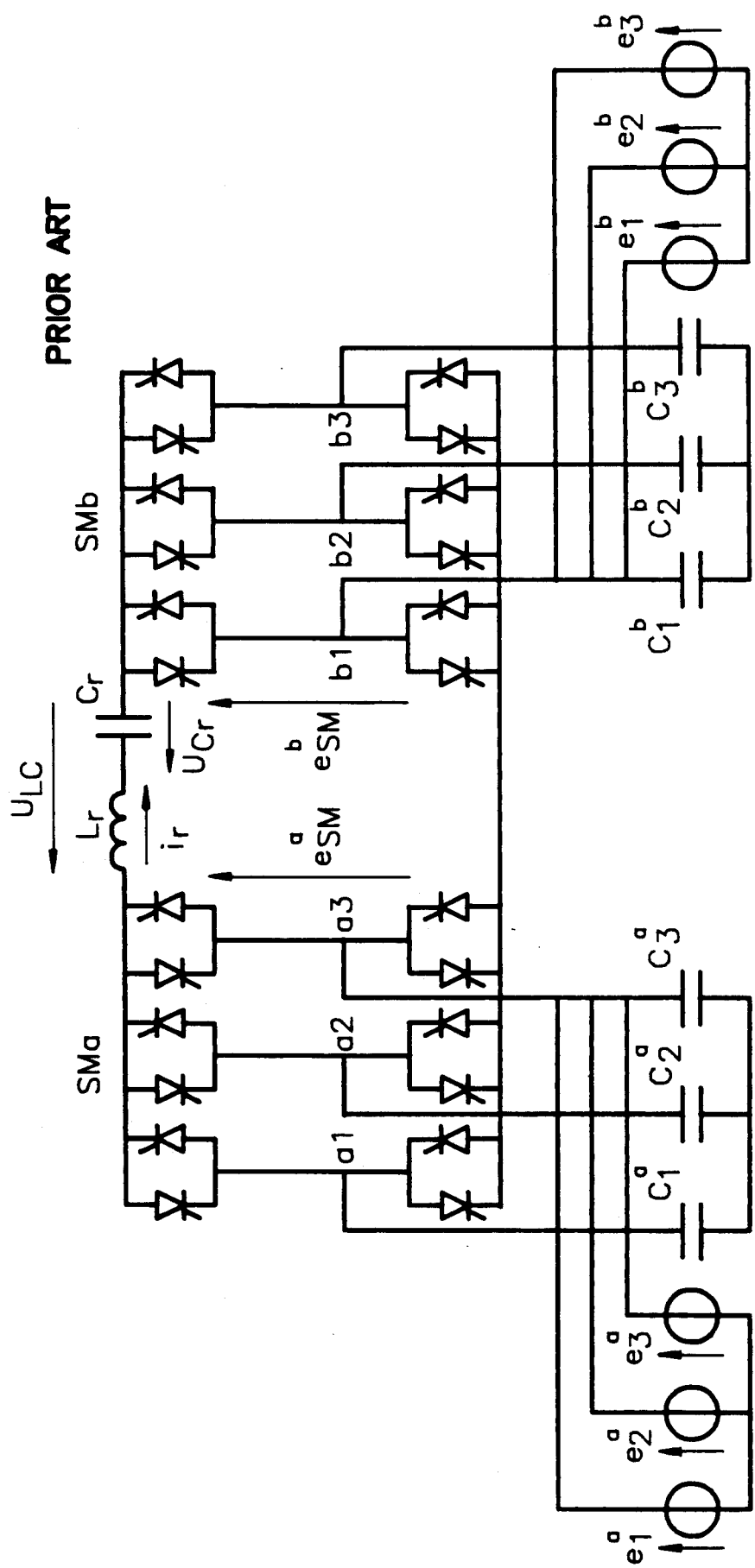
FIG. 1A illustrates a power circuit of a series-resonant AC—AC converter with 24 thyristors.
Figure 1B:
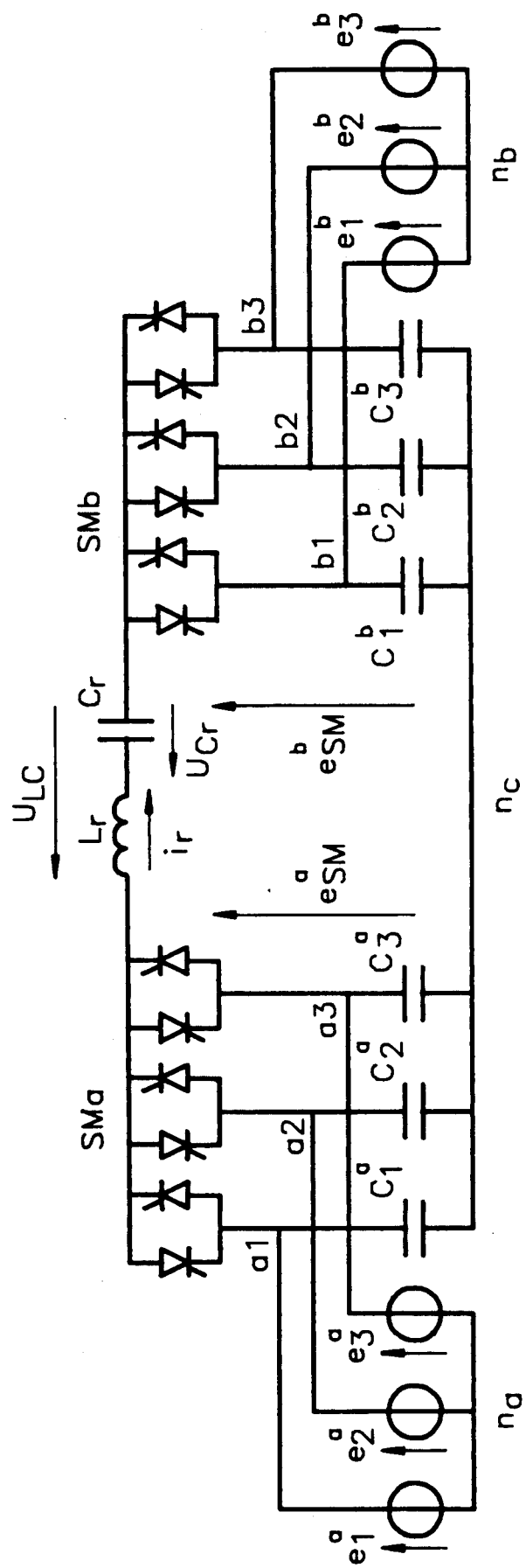
FIG. 1B illustrates a power circuit of a series-resonant AC—AC conVerter with 12 thyristors.

FIG. 1A illustrates a conventional power circuit of a series-resonant AC—AC converter with 24 thyristors whereas FIG. 1B illustrates a power circuit of a series-resonant AC—AC converter of the present invention with 12 thyristors. The system concerned is formally described with reference to the generalized schematic depicted in FIG. 1B. A voltage source $e_l^a$ (l=1,2,3) is connected to the input terminals a1 of the switching matrix SMa via a high-frequency filter. The switching matrices SMa and SMb generate a modulated high-frequency carrier $i_r$ by excitation of the resonant circuit with the passive components $L_4$ and $C_r$. This carrier is distributed to the output terminals b1 (l=1,2,3) by switching matrix SMb. The high-frequency content of the output current of switching matrix SMb is removed by the high-frequency output filter capacitors $C_l^b$. The result is a low-frequency, three-phase, sinusoidal output voltage $e_l^b$ creating a sinusoidal current through the load. Both low pass filters and the associated controlled switching matrices SMa and SMb hold an equal rank in the system. The polarity of the output current at one of the terminals of the switching matrix SMb depends on the process of the charging or discharging of the resonant capacitor $C_r$ but is independent of the polarity of the output voltages.

The series-resonant converter operates with respect to its output terminals as a converter system, which can transfer energy from the source to the load and vice versa, by reorganizing the configuration of the switches of the switching matrices SMa and SMb. This process of the selection and activation of a combination of switches is programmed by an electronic control circuit. There is a dissimilarity in the power at the output between the classical and the present power circuit. This can be understood by the two network topologies as shown in FIG. 2.

Figure 2A:
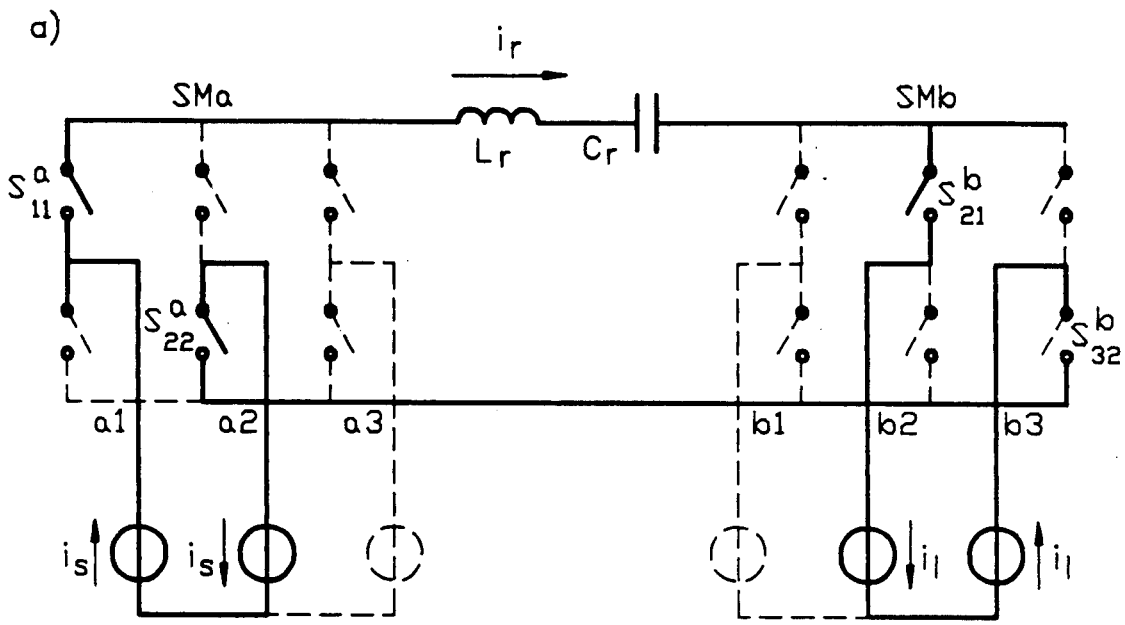
Figure 2B:
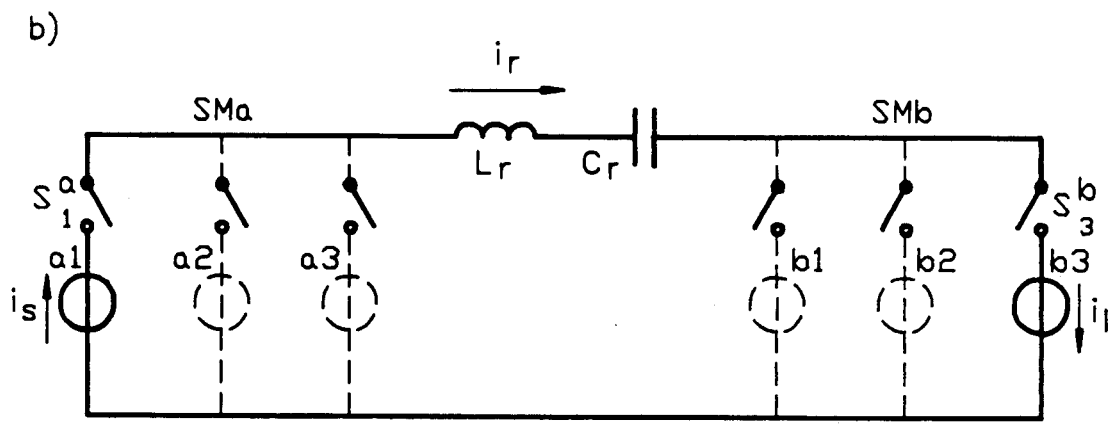

FIG. 2A is a basic circuit configuration for an AC—AC series-resonant converter with 24 semiconductor switches, whereas FIG. 2B is a basic circuit configuration for an AC—AC series-resonant converter of the present invention with 12 semiconductor switches. FIG. 2A shows an equivalent network of the classical AC—AC series-resonant power converter with 24 thyristor switches [2]. By turning on, two switches of switching matrix SMa (for example $S_{11}{}^a$ and $S_{22}{}^a$) the unfiltered source current $i_s$ for one pair of terminals (in example terminal a1 and a2) is equal to the resonant current $i_r$. The discussed action of the switching matrix SMa is identical to the one of switching matrix SMb. The unselected branches in the switching network are indicated by dashed lines.

FIG. 2B shows the presented AC—AC series-resonant power converter with 12 thyristor switches. By turning on two switches (for example $S_1{}^a$ and $S_3{}^b$) the unfiltered source current $i_s$ for one terminal of the switching matrix SMa (this example terminal 1) is equal to the resonant current $i_r$. A comparison between FIG. 2A and FIG. 2B demonstrates a reduction in the output voltage by a factor of $\sqrt{3}$ as the difference between the line-to-line voltage and the phase voltage. The resonant current has to be increased now by a factor of $\sqrt{3}$ to obtain the same output power for both converter circuits. Similar results will be established for a comparison of a half-bridge and a full-bridge configuration of a DC—DC series-resonant converter.

The algorithm programmed in the control circuit has to follow two principles of operation. The first principle of operation is dominated by the control of the excitation of the series-resonant circuit. The resonant circuit as shown in FIG. 1 is driven by the excitation voltage $u_{LC}$:

$$u_{LC} = e_{SM}{}^a - e_{SM}{}^b \quad (1)$$

where $e_{SM}{}^a = e_k{}^a$, $e_{SM}{}^b = e_l{}^b$ with k=1,2,3 and l=1,2,3. To obtain a cyclic stable mode of operation for the conversion process, the net energy stored in the resonant circuit after each current pulse has to be equal. The net energy as the product of resonant current $i_r$ and excitation voltage $u_{LC}$, supplied to a lossless resonant circuit during a current pulse is consequently zero. The polarity of the resonant current $i_r$ will remain positive or negative for each individual current pulse and therefore the excitation voltage $u_{LC}$ has to change its polarity within the current pulse. During the reverse phase the product $u_{LC}i_r$ has a negative value. During this time interval energy is emanated from the resonant circuit by generating an appropriate resonant current segment. During the forward phase the product $u_{LC}i_r$ has a positive value. During this time interval energy is boosted in the resonant circuit by generating an appropriate resonant current segment. By charging the combination of input and output phases the polarity of the excitation voltage $u_{LC}$ may be changed.

The Second principle is the described process of low-frequency waveform generation. The control of the external waveforms of switching matrix SM2 is the primary objective of the electronic control circuit. This process follows the principles of a nonuniform and aperiodic modulation process. It has been treated in the prior art literature, primarily in the context of converters which transfer and control electric energy via series-resonant circuits. The train of bipolar resonant current pulses $i_r$ is distributed divided over the three output terminals of the conversion system as indicated in FIG. 2B. The selection of the output terminal depends on the magnitude and polarity of three error signals $E_l^b$. Each error signal is the difference between an output voltage $e_l^b$ and its sinusoidal reference voltage waveform $e_{Ref\,l}^b$:

$$E_l^b = e_l^b - e_{ref\,l}^b \quad (2)$$

The current pulses are converted into smoothed output voltages by three low-pass filter capacitors $C_l^b$. The use of other, passive filter elements is avoided, because the sum of the output voltages $e_l^b$ is bounded to a value of zero, and for this reason the sum of output currents $i_l^b$ (for a symmetrical load) is zero, the total charge on the output capacitors $C_l^b$ ($C_1^b = C_2^b = C_3^b$) y remains neutral:

$$\sum_{l=1}^{3} e_l^b = \sum_{l=1}^{3} Q_l/C_l^b = 0 \quad (3)$$

Each current pulse changes the charge $Q_l$ on an output capacitor $C_l^b$ a charge quantity which is small compared to its total. A great number of current pulses deliver the necessary charge $Q_l$ to the capacitors. This is always possible because the total charge delivered by an even number of resonant current pulses is neutral as well. The programmed control algorithm has to deliver the positive current pulses to the output phase with a negative error voltage $E_l^b$ and the negative pulses to the phase with a positive error voltage $E_l^b$.

FIG. 3 shows the flow diagram of the control algorithm of the series-resonant AC—AC converter. First, the phase voltages $e_l^a$ and $e_l^b$ and the error voltages $E_l^b$ are measured and sorted with respect to their magnitudes:

$e_{MinA}^a < e_{NotA}^a < e_{MaxA}^a$: sorted input phase voltages,
$e_{MinB}^b < e_{NotB}^b < e_{MaxB}^b$: sorted output phase voltages,
$E_{MinE}^b < E_{NotE}^b < E_{MaxE}^b$: sorted error voltages, FIG. 3 shows a flow diagram of the control algorithm with voltages:

$e_l^a$: input phase voltage connected to switching matrix A with index $l = 1,2,3$ corresponding to its phase number, $e_l^b$: output phase voltage connected to switching matrix B with index $l = 1,2,3$ corresponding to its phase number, $E_l^b$: phase dependent error voltage connected with index $l = 1,2,3$ corresponding to the index of the output phase, The introduced subscripts are defined as:

MinA: subscript MinAE[1,2,3] corresponding to the phase with the most negative input voltage connected to switching matrix SMa, MaxA: subscript MaxAE[1,2,3] corresponding to the phase with the most positive input voltage corresponding to switching matrix SMa, NotA: subscript NotAE[1,2,3] corresponding to the phase with the not the most positive and not the most negative input voltage connected to switching matrix SMa, MinB: subscript MinBE[1,2,3] corresponding to the phase with the most negative output voltage connected to switching matrix SMb, MaxB: subscript MaxBE[1,2,3] corresponding to the phase with the most positive output voltage corresponding to switching matrix SMb, NotB: subscript NotBE[1,2,3] corresponding to the phase with the not the most positive and not the most negative output voltage connected to switching matrix SMb, MinE: subscript MinEE[1,2,3] corresponding to the phase with the most negative error voltage related to switching matrix SMb, MaxE: subscript MaxEE[1,2,3] corresponding to the phase with the most positive error voltage related to switching matrix SMb, NotE: subscript NotEE[1,2,3] corresponding to the phase with the not the most positive and not the most negative error voltage related to switching matrix SMb, The switching algorithm is independent of the polarity of the resonant current and consequently equal for each pulse. The positive arm will be explained in the following text. The negative arm is of the same structure. Two combinations, of an input and an output voltage, have to be selected to generate the necessary positive and negative excitation voltage $u_{LC}$ to operate in the Reverse and Forward modes. These two excitation voltages are built from at least three voltage sources connected to the converter terminals. One commutation is accomplished for each resonant current pulse. One of these phase voltages is related to an error voltage $E_{MinE}^b$ because the positive current pulse will decrease a negative error voltage to obey the generation process of the output waveform. The selection of the additional two phases depends on the magnitude of the phase voltage to $e_{MinE}^b$ compared to $e_{MinA}^a$ and $e_{MaxA}^a$.

Three situations can be illustrated:
1. $e_{MinA}^a < e_{MinE}^b < e_{MaxA}^a$: step-down mode,
2. $e_{MinB}^b < e_{MaxA}^a < e_{MinE}^b$: step-up mode,
3. $e_{MinE}^b < e_{MinA}^a < e_{MaxB}^b$: step-up mode.

$e_{MinE}^b$ is the phase voltage of the output phase corresponding to an error voltage $E_{MinE}^b$. Those three situations supply different combinations as indicated through the waveforms of FIG. 4.

1. Step-down mode: $e_{MinA}^a < e_{MinE}^b < e_{MaxA}^a$.

During the first resonant current segment (Reverse phase), the excitation voltage $u_{LC}$ is equal to:

$$u_{LCR} = e_{MinA}^a - e_{MinE}^b < 0 \quad (4)$$

The energy in the resonant network will be boosted during the second current segment (forward phase) by the excitation voltage $u_{LC}$:

$$u_{LCF} = e_{MaxA}^a - e_{MinE}^b > 0 \quad (5)$$

This step-down mode is ideal because the complete current pulse will decrease the error voltage $E_{MinE}^b$.

2. Step-up mode: $e_{MinB}^b < e_{MaxA}^a < e_{MinE}^b$.

During the first resonant current segment, the excitation voltage $u_{LC}$ is equal to:

$$u_{LCR} = e_{MaxA}^a - e_{MinE}^b < 0 \quad (6)$$

FIG. 4 shows typical waveforms of the resonant current $i_r$, the excitation voltage $u_{LC}$, and the resonant capacitor voltage $u_{CR}$, for various modes of operation:
a. Step-down mode: $e_{MinA}^a < e_{MinE}^b < e_{MaxA}^a$,
b. Step-up mode: $e_{MinB}^b < e_{MaxA}^a < e_{MinE}^b$,
c. Step-up mode: $e_{MinE}^b < e_{MinA}^a < e_{MaxB}^b$.

The energy in the resonant network will be boosted during the second current segment by the excitation voltage $u_{LC}$:

$$u_{LCF} = e_{MaxA}{}^a - e_{MinB}{}^b > 0 \tag{7}$$

The excitation voltage $u_{LCF}$ is continually positive because $e_{MaxA}{}^a$ is positive and $e_{MinB}{}^b$ is always negative. This step-up mode is less effective than the step-down mode, because the error voltage $E_{MinB}{}^b$ will be decreased only during the resonant segment of the Reverse phase.

3. Step-up mode: $e_{MinE}{}^b < e_{MinA}{}^a < e_{MaxB}{}^b$.

During the first resonant current segment, the excitation voltage $u_{LC}$ is equal to:

$$u_{LCR} = e_{MinA}{}^a - e_{MaxB}{}^b < 0 \tag{8}$$

The excitation voltage $u_{LCR}$ is always negative because $e_{MinA}{}^a$ is negative and $e_{Minb}{}^b$ is always positive. The energy in the resonant network will be boosted during the second current segment by:

$$u_{LCF} = e_{MinA}{}^a - e_{MinE}{}^b > 0 \tag{9}$$

This step-up mode is less effective than the step-down mode, because the error voltage $E_{MinE}{}^b$ will be decreased only during the resonant current segment of the Forward phase.

The switching algorithm has some more features as explained in FIG. 3.

a. The resonant current pulse will only be started if there is at least one error voltage $E_i{}^b$ with an amplitude larger than a specific threshold value b. The generated resonant current pulse will be positive if the initial resonant capacitor voltage $u_{CR}$ is negative and vice versa.

c. The switching time between the Reverse and the Forward current segment is under the control of an electronic circuit indicated as the predictor. This circuit calculates the stored energy in the resonant network at the end of the resonant current pulse.

d. The algorithm is reset to its initial status if a detection circuit for the resonant current observes a zero-crossing of this current.

The character of the load: capacitive, inductive or dissipative, does influence the output currents $i_1{}^b$, $i_2{}^b$ and $i_3{}^b$ but not the output voltages $e_1{}^b$, $e_2{}^b$ and $e_3{}^b$ as long as the converter is not overloaded. For a symmetrical load network in star configuration the voltage of the neutral $n_b$ of the load will be at zero. The output currents are symmetrical because the output voltages are symmetrical while the sum of the output currents is zero. The voltage of the neutral of the load is at zero and may therefore be connected to the neutral of the converter without current flowing through this link. Only a small asymmetry between the output voltages caused by the high frequency ripple voltages generates a low high-frequency current through the link between the neutral of converter $n_c$ and the neutral of load $n_b$ as recorded in FIG. 5 and FIG. 6.

FIG. 5, shows a measurement of the output current with a resistive load [time 40 ms] with the upper trace illustrating load current $i_l{}^b$, and the lower trace illustrating resonant current $i_r$.

FIG. 6, shows a measurement of the current through the link between $n_c$ and $n_b$ [time 10 ms] with the upper trace being the current through the link and the lower trace being the resonant current $i_r$.

In the case of an asymmetrical load the individual output currents are different. The influence of an asymmetrical load on the output voltages depends on the asymmetry of the load and whether the neutral of converter and load are tied together. Three different modes can be distinguished now:

1. The particular neutrals of converter $n_c$ and load $n_b$ are floating. Therefore the total of the output currents is equal to zero (Kirchoff's law: $i_1{}^b + i_2{}^b + i_3{}^b = 0$) even for an asymmetrical load. The total charge on the output capacitors ($C_1{}^b$, $C_2{}^6$ and $C_3{}^b$) is maintained and the distribution of the charge over the capacitors remains symmetrical, as do the output voltages.

2. The neutral of the load $n_b$ remains at zero when it is connected to the neutral of the converter $n_c$. The sum of the output currents will no longer be equal to zero ($i_1{}^b + i_2{}^b + i_3{}^b ZO$). The result is a low-frequency current running through the connection between the neutrals. Therefore the total charge on the output capacitors $C_1{}^b$, $C_2{}^b$ and $C_3{}^b$ differs now from ro. The series-resonant circuit cannot supply a low-frequency compensation current. A symmetrical division of the charge across the output capacitors is not possible the output voltages $e_1{}^b$, $e_2{}^b$ and $e_3{}^b$ become asymmetrical.

3. The output voltages $e_1{}^b$, $e_2{}^b$ and $e_3{}^b$ will be asymmetrical if the output current is equal to the maximum current which the converter can supply. This happens when an asymmetrical load impedance becomes close to zero (a short circuit between two terminals). Two output phase-voltages are equal in magnitude. The third output phase-voltage has an opposite sign with an amplitude of a factor of two.

The source must be able to generate and accept electric power. The neutral $n_a$ source can be connected to the neutral $n_c$ of the converter. Each voltage source $e_1{}^a$, $e_2{}^a$ and $e_3{}^a$ will charge the filter capacitors $C_1{}^a$, $C_2{}^a$ and $C_3{}^a$ to match their voltage. Only high-frequency components of the source currents flows through the link between $n_a$ and $n_c$. The amplitude of this high-frequency current depends on the source impedances and is recorded in FIG. 7.

FIG. 7 is a measurement of the current through the link between $n_a$ and $n_c$ [time 10 ms] with the upper trace being current through the link and the lower trace being resonant current $i_r$.

FIG. 8 depicts a block diagram of the control electronics of the series-resonant power converter. This figure is the result of the flow diagram presented in FIG. 3. The analog voltage and current waveforms are located in the middle of the block diagram. At the left of this diagram there are four test circuits which produce signals for the control circuit. At the right of this diagram there are the selector circuits for activating the proper switches. The $u_{Cr}$-polarity detector detects the polarity of the resonant capacitor voltage $u_{Cr}$. For a positive voltage, the capacitor $C_r$ will be discharged and the next current pulse $i_r$ will be consequently negative. For a negative voltage, the capacitor $C_r$ will be charged and the next current pulse $i_r$ will be consequently positive.

The point in time where internal signals will be changed is locked to the zero crossing of the resonant current $i_r$ at the end of the resonant current pulse by the zero current detector. The control circuit can start a new current pulse when the resonant current is zero. The $u_{LC}$-polarity detector checks at the beginning of each current pulse whether the excitation voltage $u_{LC}$ has the proper polarity. Control of the electric energy stored in the resonant capacitor $C_r$ is necessary to obtain an uninterrupted series-resonant oscillation [5]. The predictor controls the excitation of the series-resonant circuit from pulse to pulse in a predictive way on extrapolating the signals $i_r$, $u_{Cr}$ and $u_{LC}$. This control has two purposes:

1. to limit the momentary amplitude of the resonant capacitor voltage $u_{CR}$ from pulse to pulse to avoid excessive component stresses,
2. to satisfy the conditions of a continuous oscillation for each half period independently of the waveform generated at the output.

The analogue signals corresponding to $e_k{}^l$ and $e_l{}^b$, are the input waveforms of the $u_{LC}$-polarity detector and the predictor. The k and l value is selected by the selector $e_1{}^a$, $e_2{}^a$ or $e_3{}^a$ and the selector $e_1{}^b$, $e_2{}^b$ or $e_3{}^b$.

The switch selector is responsible for the selection process of the active switching elements in both switching matrices, depending on the conversion ratio of the power converter.

FIG. 9A illustrates the results of a computer simulation of the resonant current $i_r$ [150 A/div]. FIG. 9B illustrates the results of a computer simulation of the resonant capacitor voltage $u_{Cr}$ [300 V/div]. FIG. 9C illustrates the results of a computer simulation of the output voltage $f_l{}^b = 50$ Hz [100 V/div]. FIG. 9D illustrates the results of a computer simulation of the source voltage $f_l{}^a = 60$ Hz [100 V/div].

The 12-thyristor converter was simulated by a computer simulation program. The results of simulation are indicated in FIG. 9A–9D. confirming the characteristics of this class of resonant AC—AC converters. The parameters of the converter for the simulation were:

$L_r = 19$ mH, $C_r = 2.7$ mF,
$C_l{}^a = C_l{}^b = 100$ mF (P = 1,2,3),
$e_{lMAX}{}^a = 50$ V, 60 Hz,
$e_{lMAX}{}^b = 100$ V, 50 Hz.

An experimental series-resonant converter with twelve thyristors was designed and constructed. Existing components and circuits were used to demonstrate a principle rather than to optimize the system. FIG. 10, 11 and 12 were taken with a digital recorder (resolution 8 bits, sample rate 20 ns) and copied on a X-Y plotter with the following conditions:

| source | | load | | resonant converter | |
|---|---|---|---|---|---|
| P | = 2.046 kW | P | = 1.677 kW | P | = 0.390 kW |
| f | = 50 Hz | f | = 50 Hz | f | = 9.09 kHz |
| e | = 70.7 V | e | = 51.8 V | dist. | = 1.3% |
| i | = 9.65 A | i | = 10.8 A | i | = 90 A |

FIG. 10 shows the aperiodic waveforms of the resonant current $i_r$ and the resonant capacitor voltage $u_{Cr}$ and represents the measurement of $i_r$ and $u_{CR}$ [time 1 ms] with the upper trace being the resonant current $i_r$, and the lower trace being the capacitor voltage $u_{Cr}$. The amplitude of the resonant capacitor voltage appears to be constant. The output voltages are recorded in FIG. 11 for an output frequency of 50 Hz.

FIG. 11 is a measurement of output voltages $e_1{}^b$, $e_2{}^b$ and $e_3{}^b$ [time of measurement 40 ms]. FIG. 12 shows a measurement of input currents $i_1{}^a$, $i_2{}^a$ and $i_3{}^a$ [time of measurement 40 ms].

FIG. 12 shows the current $i_l{}^a$ at the input matrix SMa. This current is delivered during the time interval that a particular source voltage is maximal. Other tests were carried out for different values of the output current and voltage and a range for the fundamental frequency $f_l{}^b$ of a three terminal, sinusoidal output voltage of $0 < f_l{}^b < 100$ Hz. The system was tested with respect to:

a. functional integrity under adverse conditions of operation,
b. output voltage control,
c. efficiency of the conversion process.

The series-resonant AC—AC converter with twelve thyristor switches of the present invention has the following advantages:

1. the converter with a reduced number of bipolar switches, has only 12 thyristors and consequently 12 gate pulse amplifiers: less than the 24-thyristor converter. This results in lower costs and a less complex electronic control and protection system.
2. the input voltage of the 12-thyristor converter equals the phase voltage of a 3-terminal source voltage, while the 24-thyristor converter applies the line-to-line voltage. It implies less stress on the components of the converter when the source voltages are equal, but it is also possible to apply to the 12-thyristor converter a $\sqrt{3}$ times higher source voltage with the same stress on the components.
3. the 12-thyristor converter which distributes the same amount of power with the same source voltages as the 24-thyristor converter, needs a higher resonant current of a factor of $\sqrt{3}$ times. For the 12-thyristor converter the current passes only two thyristors, while in the more complex circuit four thyristors are passed. The losses in the thyristors are lowered but the losses in the resonant inductor are increased. Redimensioning of the resonant inductor for less losses gives the 12-thyristor converter a higher degree of efficiency.
4. Grounding of the individual neutrals of the capacitor banks, the load and the converter, is possible. It is noted that this will not be feasible for a 24-thyristor converter.
5. The sum of the output voltages is forced to be zero for the 12-thyristor converter. An unbalanced voltage system may lead to saturation of transformers and electrical machines.
6. the power factor of the source current can be controlled.

In comparison with the whole group of three-phase AC—AC converters, this AC—AC series-resonant converter with the minimal number of twelve thyristor switches (one unipolar switch for each terminal and current polarity makes a total of twelve switches) demonstrates the characteristics of:
low cost,
high efficiency,
low distortion of the output waveforms,
prevention of excessive stress on components,
fast system response.

Electrical characteristics were experimentally verified and have been proven by simulation.

The present disclosure includes that contained in the appended claims as well a that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved resonant converter for transferring electrical power between a first, second and third input and a first, second and third output, comprising:
   a series resonant circuit including a capacitor and an inductor connected in series;
   first, second and third bidirectional input switch means connecting the first, second and third inputs to said series resonant circuit, respectively;
   first, second and third bidirectional output switch means connecting the first, second and third outputs to said series resonant circuit, respectively;
   first, second and third input capacitor means connected to the first, second and third inputs, respectively;
   first, second and third output capacitor means connected to the first, second and third outputs, respectively; and
   means connecting said first, second and third input capacitor means to said first, second and third output capacitor means for enabling only six bidirectional switches to interconnect the first, second and third inputs to the first, second and third outputs.

2. An improved resonant converter for transferring electrical power as set forth in claim 1, wherein each of said bidirectional input switch means and each of said bidirectional output switch means includes a pair of unidirectional switches connected in parallel with reverse polarity.

3. An improved resonant converter for transferring electrical power as set forth in claim 1, wherein said first bidirectional input switch means and said first bidirectional output switch means interconnect the first input with the first output with said series resonant circuit being interposed between the said first bidirectional input switch means and said first bidirectional output switch means;
   said second bidirectional input switch means and said second bidirectional output switch means interconnect the second input with the second output with said series resonant circuit being interposed between the said second bidirectional input switch means and said second bidirectional output switch means; and
   said third bidirectional input switch means and said third bidirectional output switch means interconnect the third input with the third output with said series resonant circuit being interposed between the said third bidirectional input switch means and said third bidirectional output switch means.

4. An improved resonant converter for transferring electrical power as set forth in claim 1, wherein said first, second and third input capacitor means are connected in series with said first, second and third output capacitor means between the first, second and third inputs and the first, second and third outputs, respectively.

5. An improved resonant converter for transferring electrical power as set forth in claim 1, wherein said first, second and third input capacitor means are connected in series with said first, second and third output capacitor means between the first, second and third inputs and the first, second and third outputs, respectively;
   said series resonant circuit being connected in parallel with said first, second and third input and output capacitor means between the first, second and third inputs and the first, second and third outputs.

6. An improved three phase AC to AC series resonant converter for transferring electrical power between a first, second and third phase input and a first, second and third phase output, comprising:
   a series resonant circuit including a capacitor and an inductor connected in series;
   first, second and third bidirectional input switch means connecting the first, second and third phase inputs to said series resonant circuit, respectively;
   first, second and third bidirectional output switch means connecting the first, second and third phase outputs to said series resonant circuit, respectively;
   first, second and third input capacitor means connected to the first, second and third phase inputs, respectively;
   first, second and third output capacitor means connected to the first, second and third phase outputs, respectively; and
   means connecting said first, second and third input capacitor means in series with said first, second and third output capacitor means, respectively, for enabling only six bidirectional switches to interconnect the first, second and third phase inputs to the first, second and third phase outputs.

7. An improved three phase AC to AC series resonant converter for transferring electrical power between a first, second and third phase input and a first, second and third phase output, comprising:
   a series resonant circuit including a capacitor and an inductor with said capacitor being connected in series with said inductor;
   first, second and third bidirectional input switch means
   first, second and third bidirectional output switch means;
   said first bidirectional input switch means and said first bidirectional output switch means interconnecting the first phase input with the first phase output with said series resonant circuit being interposed between the said first bidirectional input switch means and said first bidirectional output switch means;
   said second bidirectional input switch means and said second bidirectional output switch means interconnecting the second phase input with the second phase output with said series resonant circuit being interposed between the said second bidirectional input switch means and said second bidirectional output switch means;
   said third bidirectional input switch means and said third bidirectional output switch means interconnecting the third phase input with the third phase output with said series resonant circuit being interposed between the said third bidirectional input switch means and said third bidirectional output switch means;
   first, second and third input capacitor means;
   first, second and third output capacitor means;
   said first, second and third input capacitor means being connected in series with said first, second and third output capacitor means between the first, second and third inputs and the first, second and third outputs, respectively; and
   said first, second and third input and output capacitor means being connected in parallel to said series resonant circuit between the first, second and third inputs and outputs for enabling for enabling only six bidirectional switches to interconnect the first, second and third phase inputs to the first, second and third phase outputs.

* * * * *